United States Patent [19]
Spietz

[11] 3,726,147
[45] Apr. 10, 1973

[54] ENERGY ABSORBING STEERING WHEEL

[75] Inventor: Frederick C. Spietz, Highland Park, Mich.

[73] Assignee: Chrysler Corporation, Highland Park, Mich.

[22] Filed: July 14, 1971

[21] Appl. No.: 162,378

[52] U.S. Cl. .................................................. 74/552
[51] Int. Cl. ............................................. B62d 1/08
[58] Field of Search ........................................ 74/552

[56] References Cited
UNITED STATES PATENTS

| 3,555,925 | 1/1971 | Bowser | 74/552 |
| 2,197,317 | 4/1940 | Ratner | 74/552 |

FOREIGN PATENTS OR APPLICATIONS

| 848,458 | 9/1952 | Germany | 74/552 |
| 668,565 | 11/1929 | France | 74/552 |
| 1,216,366 | 4/1960 | France | 74/552 |

Primary Examiner—Charles J. Myhre
Assistant Examiner—F. D. Shoemaker
Attorney—George W. Talburtt et al.

[57] ABSTRACT

A steering wheel having a plurality of spokes each of which include two generally radially extending portions connected by a generally arcuate portion, the two radially extending portions being circumferentially offset from one another. The inner portions are subject to torsion upon impact against the wheel and will deform to absorb energy when the impact is of a predetermined magnitude.

4 Claims, 4 Drawing Figures

PATENTED APR 10 1973
3,726,147
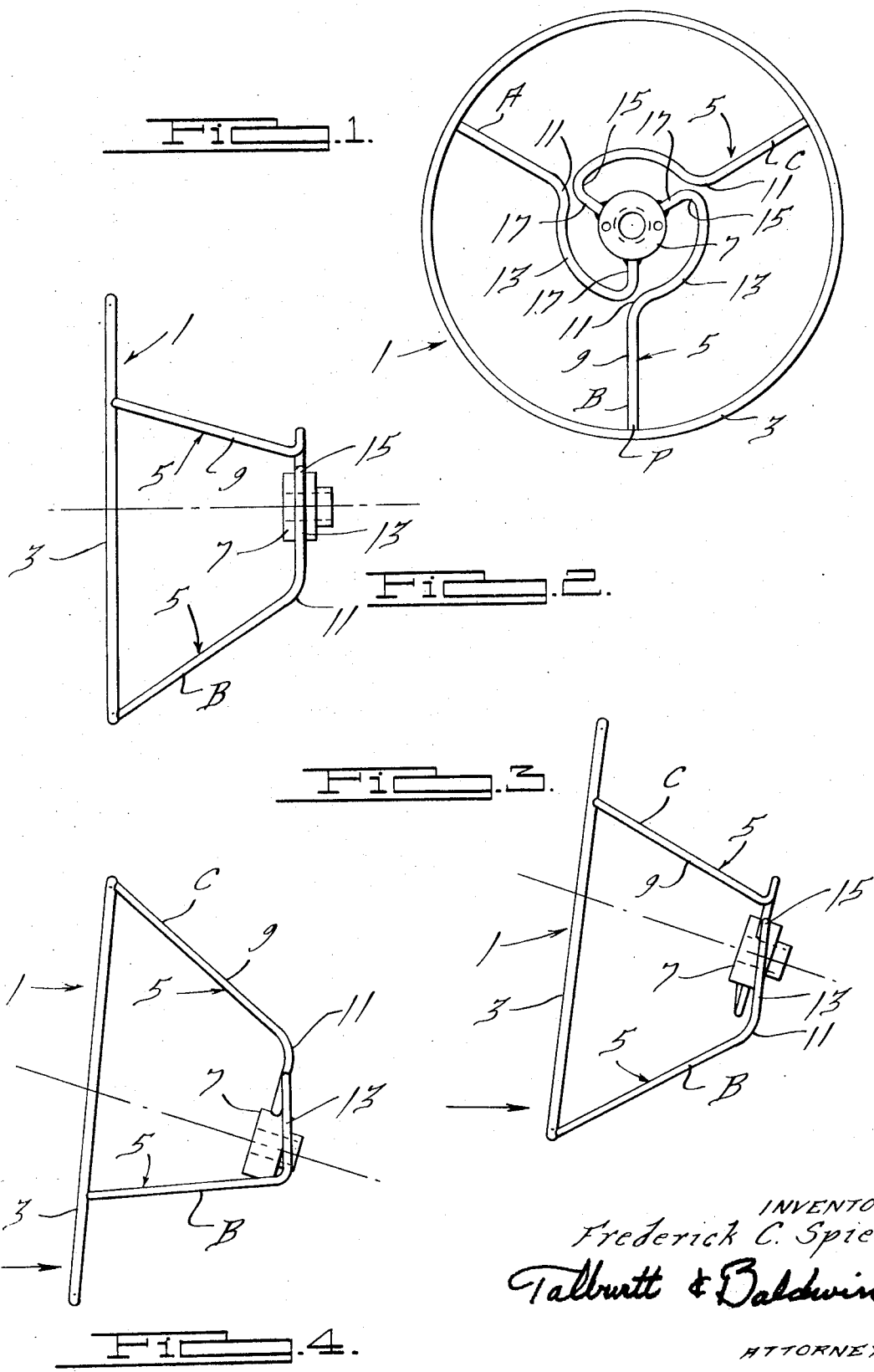
INVENTOR
Frederick C. Spietz,
Talbutt & Baldwin,
ATTORNEYS.

ENERGY ABSORBING STEERING WHEEL

BACKGROUND OF THE INVENTION

This invention relates to steering wheels, and more particularly to an energy absorbing steering wheel for an automotive vehicle.

There are many types of energy absorbing steering wheels currently in use and also shown in the prior art. Some of these utilized centrally located cushions or pads as an energy absorbing means. Other utilize collapsible members between the hub of the wheel and the steering shaft. Still others use the deformability of the rim and other spoke components to absorb energy. The present invention is generally of the latter type, i.e., energy is absorbed by the deformation of certain spoke components of the wheel.

SUMMARY OF THE INVENTION

Briefly, this invention comprises a steering wheel having a plurality of spokes which act somewhat like torsion bars which yield to absorb energy.

One of the primary objects of this invention is the provision of a steering wheel which is adapted to absorb energy upon impact.

Another object of this invention is to provide a steering wheel of the class described in which energy is absorbed by twisting of metal, i.e., certain components undergo torsional stress, and deform.

A further object of this invention is to provide a steering wheel such as described which is adapted to deflect approximately the same amount under the same load regardless of whether such load is applied at the intersection of a spoke and rim or at a point between the intersections of two adjacent spokes with the rim.

Still another object of this invention is to provide a steering wheel of the type described which is economical in construction and efficient in operation.

Other objects and advantages of this invention will be made apparent as the description progresses.

BRIEF DESCRIPTION OF THE DRAWINGS

In the accompanying drawings in which one of various possible embodiments are illustrated, FIG. 1 is a plan view of a preferred embodiment of this invention;

FIG. 2 is a side elevation of FIG. 1;

FIG. 3 is a side elevation of a steering wheel such as illustrated in FIG. 2 illustrating deformation of the wheel upon an impact applied at the intersection of a spoke and the rim, the force of the impact being applied in the direction of the arrow; and FIG. 4 is a view somewhat similar to FIG. 3, the wheel being rotated 60° from its FIG. 3 position, the load causing deformation at a point between the intersections of two spokes with the rim.

Like parts are indicated by corresponding reference characters throughout the several views of the drawings.

DESCRIPTION OF THE PREFERRED EMBODIMENT

Referring now to the drawings, a steering wheel of this invention is generally indicated at 1. For the sake of clarity the wheel is shown without padding or other covering thereon. However, it will be understood that such padding or other covering could be provided if desired.

Wheel 1 is shown to include a circular rim 3 formed of a metal rod, such as steel for example, and a plurality of spokes 5. The spokes 5 are secured at one end, as by welding, to the rim 3 and at the other end to a hub 7. It will be understood that hub 7 may be secured to a steering shaft (not shown).

As shown, three spokes 5 are provided, each spoke being spaced 120° from the adjacent spoke. Each spoke includes a straight leg 9 extending radially and axially from the rim 3 toward the hub 7. The leg 9 is inclined relative to the axis of rotation of the hub. Leg 9 is connected at its inner end by a bend or radiused portion 11 to a curved or arcuate section 13 which extends slightly less than 120° around the hub in a plane generally normal to the axis of rotation of the wheel 1. At the end of section 13 opposite its connection to leg 9, a bend or radiused portion 15 joins it to a relatively short radially extending portion 17. Portion 17 is located in a plane which is generally perpendicular to the axis of rotation of the hub 7. It will be seen that a generally or even partially axially directed force on the radially outer and axially upper end position of a leg 9 of each spoke 5 would, without the attached rim 3, tend to cause the leg 9 to bend in a clockwise direction when looking at the leg from the side thereof opposite to arcuate portion 13 (such as the view of the upper leg in FIG. 2). In addition, the leg 9 will tend to cause the adjacent arcuate portion 13 to undergo torsional stress or twist in a similar direction. Moreover, the leg 9 and portion 13 will tend to cause bend 15 and portion 17 to twist or undergo torsional stress. When viewed from a position aligned with but spaced outwardly from the portion 17, such portion will tend to rotate counterclockwise. All of the bending and twisting of the various components absorbs energy.

Referring now to FIG. 1, assuming the three spokes are designated A, B, and C and that a force is applied in a partially or generally axial direction to the rim 3 and spoke B at approximately point P, such as might be applied by a torso during a collision, the spoke B would bend in approximately the same manner as described above as the rim 3 became generally aligned with and parallel to the torso. Thus the spoke B will undergo torsional stress and bending. The upper strokes A and C may twist at the point of connection with rim 3 as well as at other points throughout the length of the spokes. It will be understood that a predetermined amount of force applied at point P in a predetermined direction results in a predetermined distortion of the spokes and wheel.

If the same force is applied in the same direction when the wheel is rotated counterclockwise 60° from its FIG. 1 position so that the point of application of the force is now midway between two spokes 5, it is anticipated that the following bending takes place:

The spokes A and B will be substantially equidistant from the point of application of the force so that the forces applied to the outer ends of legs 9 of each spoke A and B are approximately equal. Since the rim 3 is, in effect, a lever pivoting about some point between the point of connection between the rim and spoke C (see FIG. 4) and the lower portion of the rim, and since the force is applied at the lower portion of the rim, the total force applied to the outer ends of legs 9 of spokes A and B will be increased over the force applied at the point of application. Since the total force applied to the legs 9 is divided approximately equally between the legs, each leg A and B receives more than half the force applied at the point of application.

In any event, both spokes A and B will twist and undergo torsional stress in the manner described above to absorb energy. The rim will be forced to a position generally parallel and aligned with the torso. This same torsional action will occur for spokes A and B in varying and different amounts depending upon the location of the point of application of force to the rim.

It has been found that the rim 3 can be substantially moved from a position in which it is located in a plane generally perpendicular to the axis of rotation, i.e., from a plane which is generally inclined with respect to the torso of the driver upon the application of a force of a substantially predetermined magnitude applied against the lower portion of the rim, regardless of the location of the spokes with respect to the point of impact. This is believed to be a result of the capability of the spoke to undergo the torsional deformation. This torsional deformation takes place in part because both the leg 9 of each spoke and the portion 17 of each spoke are radially extending but are circumferentially offset from one another by the arcuate portion 13. Thus, any generally axially directed forces applied to the leg 9 are transferred to the portion 17 by the arcuate connector portion 13 in a manner which primarily causes the portion 17 to undergo torsional stresses rather than bending stresses. As the amount of circumferential offset between portions 5 and 17 decreases, the torsional stress on portion 17 decreases and the bending stresses increase so that a combination of such stresses are present.

In addition, each leg 9 will undergo torsional stress since it is connected at its inner end to arcuate section 13 rather than being connected directly to hub 7. However, since the legs 9 do have an axial dimension, i.e., they also extend in a generally axial direction, and since the arcuate sections 13 are not as rigid as the hub 7, considerably less torsional deformation takes place at the bend 11 than at the bend 15.

Thus, the deformation and energy absorption abilities of the steering wheel remain substantially the same regardless of whether the point of impact is adjacent the connection of a spoke to the rim or at a point somewhere in between spokes. This is opposed to some steering wheels which require that a considerably higher load be placed thereon when the point of impact is at the point of connection of a spoke to the rim than when the force is applied between two spokes.

In view of the foregoing it will be seen that the several objects and other advantages of this invention are attained.

Although only one embodiment of the invention has been disclosed and described, it is apparent that other embodiments and modifications of the invention are possible.

I claim:

1. An energy absorbing steering wheel comprising a rim, a hub adapted to be connected to a steering shaft, and a plurality of spokes connecting said rim and hub together, each of said spokes including means for undergoing torsional stress upon the application of a force in a generally axial direction on the radially outer end thereof, said means including first and second generally radially directed portions, said first portion being connected at one end to said hub, and said second portion being connected at one end to said rim, said portions being offset from one another circumferentially, a curved section joining said first and second portions of each said spoke, said curved portions lying in substantially the same plane as said first portions.

2. An energy absorbing steering wheel as set forth in claim 1 wherein each curved section generally lies on an arc having a substantially constant radius, with the center of such arc being substantially the same as the center of said hub.

3. An energy absorbing steering wheel comprising a rim member adapted to be grasped for turning the wheel, a centrally located member adapted to connect to a steering shaft rotatable about an axis, and a plurality of spokes connecting said rim member to said centrally located member, each of said spokes including first and second portions, said first portion being connected to said centrally located member and said second portion being connected to said rim, said first and second portions of the same spoke being offset in a circumferential direction from one another, and a connector section joining the radially outer end of said first portion to the radially inner end of said second portion, at least one of said portions being adapted to undergo torsional stress upon the application of a generally axially directed force on the outer end of the respective spoke, said one of said portions of each spoke being generally radially directed and located in a plane generally perpendicular to said axis, the other of said portions of each spoke being generally radially directed and located in a plane which is inclined with respect to said axis, and said connector section being generally arcuate and joined to each of said first and second portions by radiused portions, said connector section being located in substantially the same plane as said one portion, said spokes being substantially equally spaced circumferentially around the wheel with said connector sections substantially spanning the distance between said first portion of one spoke and said other portion of the adjacent spoke.

4. An energy absorbing steering wheel as set forth in claim 3 wherein the application of said force causes said second portion to tend to rotate in one direction relative to said axis and said first portion to rotate in another direction relative to said axis.

* * * * *